March 22, 1938. J. C. THORESEN 2,111,678
TELEMETRIC TRANSMITTER
Filed July 6, 1932 4 Sheets—Sheet 1

John. C. Thoresen
INVENTOR
BY Thomas A. Jenkins
ATTORNEY

March 22, 1938.  J. C. THORESEN  2,111,678
TELEMETRIC TRANSMITTER
Filed July 6, 1932  4 Sheets-Sheet 2
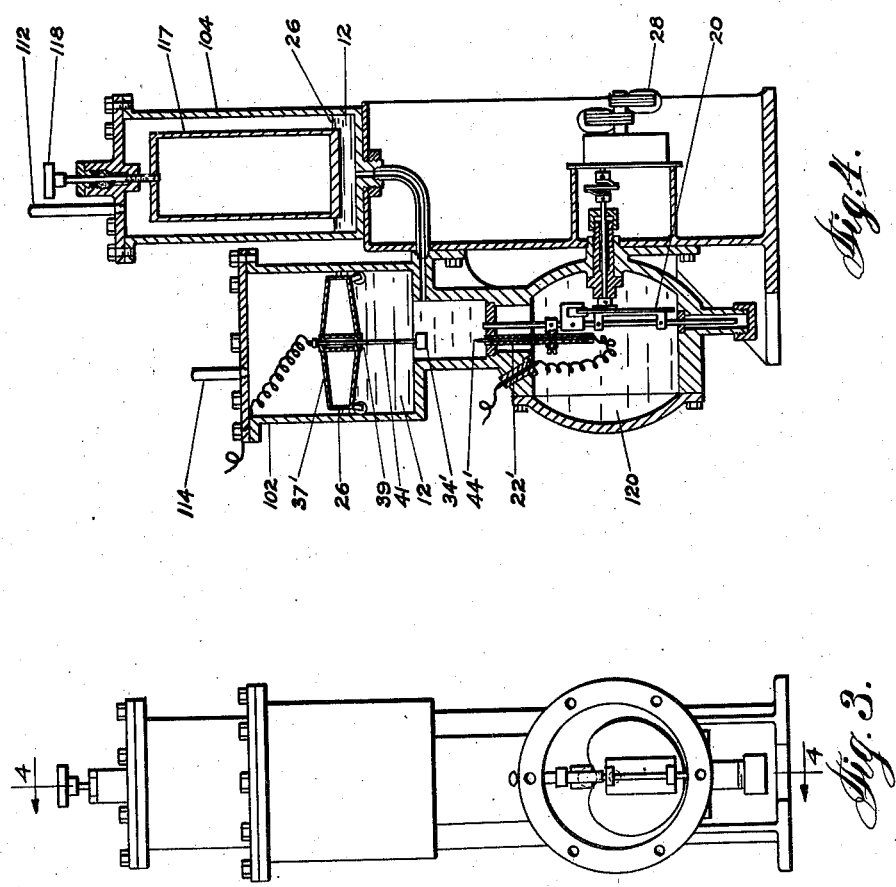
John C. Thoresen
INVENTOR
BY Thomas A. Jenckes
ATTORNEY March 22, 1938.  J. C. THORESEN  2,111,678
TELEMETRIC TRANSMITTER
Filed July 6, 1932   4 Sheets-Sheet 3

John C. Thoresen
INVENTOR

BY Thomas A. Jenkins
ATTORNEY

March 22, 1938. J. C. THORESEN 2,111,678
TELEMETRIC TRANSMITTER
Filed July 6, 1932  4 Sheets-Sheet 4
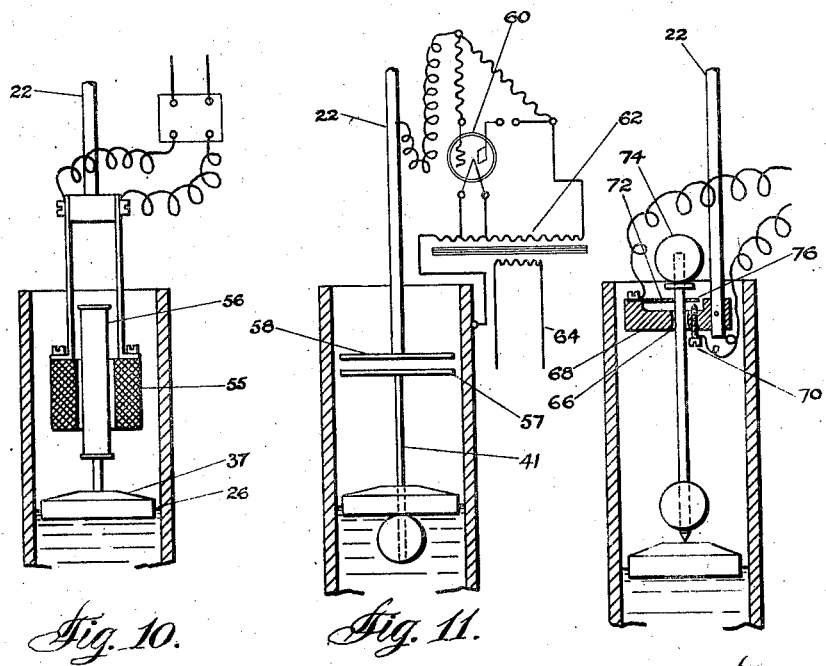
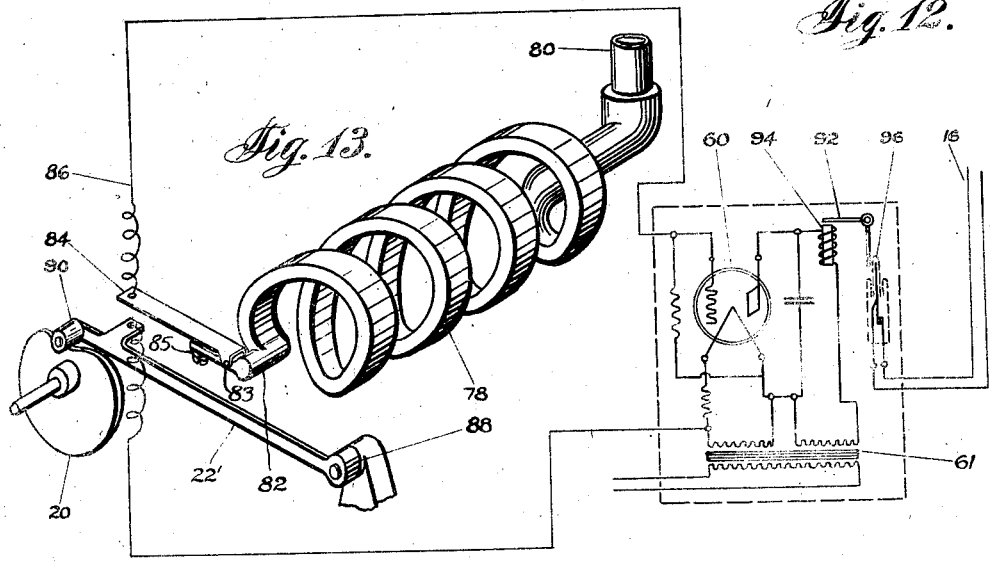
John C. Thoresen
INVENTOR
BY Thomas A. Jancher
ATTORNEY Patented Mar. 22, 1938

2,111,678

UNITED STATES PATENT OFFICE 2,111,678

TELEMETRIC TRANSMITTER

John C. Thoresen, Providence, R. I., assignor to Builders Iron Foundry, Providence, R. I., a corporation or Rhode Island Application July 6, 1932, Serial No. 621,022

16 Claims. (Cl. 73—205)

My invention relates to improvements in transmitters, particularly adapted for telemetric use. I am aware that others have attempted to make a sweeping or wiping contact for a time interval through a conducting liquid, but I have found that in due course of time the surface of the conducting liquid, such as mercury tends to become oxidized, or the metal of the member which projects into the surface becomes oxidized so as to form a scum on the top of mercury or other conducting liquid employed to render the transmitting or other device employed inaccurate.

An object of my invention therefore is to provide a transmitter of this description employing mercury or other conducting liquid and means to make contact therewith without actually piercing the surface thereof so as to avoid the formation of this scum.

A further feature of my invention is to provide a transmitter particularly adapted for telemetric use to accurately mechanically transfer a quantity into its square root and transmit it in terms of its square root. For this purpose I provide an accurately formed square root cam and actuate a member into contact with a contact medium, the surface of which varies with the quantity. By moving a member preferably by reciprocating it into contact with said medium through the entire square root cycle of a square root or other cam, it is apparent that I provide a period equal to one entire revolution of the cam and that depending on the height of the contact line or conducting liquid or contact surface the proportion of the cycle of rotation of said cam during which a contact is formed will depend on the height of the contact medium or the conducting liquid and that the cycle of rotation of said square root or other cam will therefore be divided into two periods, one of conductance during which a contact is made depending on the height of liquid or other contact medium and one of nonconductance, thereby transmitting impulses per cycle of square root or other cam rotation of a time duration proportionate to the square root of the height of the contact line or conducting liquid or otherwise in accordance with the shape of the cam. It is also obvious that by changing shape of cam that impulses proportionate to the height of the contact surface can also be transmitted. It is obvious, however, that the cycle may be varied if desired in order to have the electric impulses set up during the portion of the cycle in which there is no contact.

Further features of my invention relate to the specific construction of an improved type of telemeter functioning along these principle lines, namely, (a) to transmit in terms of the square root by the medium of an accurately formed square root cam and (b) employing a conducting liquid and forming electrical impulses in a telemetric or other circuit of a time duration which varies as the period of contact with said conducting liquid without actually piercing the surface of the conducting liquid. Various features of my invention relate to the specific type of means I may employ to actually set up these electrical impulses in the manners described.

My invention is particularly adapted for use in telemetering the rate of flow of fluid in a conduit and for this purpose I preferably employ within a U-tube a liquid medium responsive to differential pressure, and hence to the square of the rate of flow, and form contact by means of a revolving square root cam forming contact in cooperation with said liquid without piercing the surface thereof or if desired employing other types of mediums responsive to the quantity to be transmitted. I also, if desired, in the broader aspects of my invention provide an improved transmitter for transmitting the square root of the pressure.

A further feature of my invention relates to the provision of a transmitter adapted to transmit the flow of gases. In order to achieve an even and positive drive of the square root or other cam, I preferably employ a synchronous electric motor, which may be in synchronism with the motor on a suitable receiver to equally and simultaneously pick up the time duration of the electrical impulses in a receiver.

Further features of my invention include the means I employ for making zero adjustments and various other specific details in connection with my invention.

A further feature of my invention is to provide a telemetric transmitter in which the only work necessary to be done by actual physical changes in the height of the quantity-responsive medium is to move an electric switch or form an electric contact to permit the electric circuit, including said switch to do the balance of the work of telemetric transmission. It is also apparent that if desired relay or other means may be provided to reduce the current at the actual point of contact to a relatively small amount. So far as I am aware I am the first to provide a transmitter for the operation of which relatively small amounts of power are necessary to actuate the transmitting mechanism thereof. I also preferably employ a relatively cheaper kind of a transmitter so that the chances of corrosion on the exposed electrical parts and connections immersed normally within the oil field are correspondingly lessened.

These and such other objects of my invention as may hereinafter appear will be best understood from a description of the embodiments thereof shown in the accompanying drawings.

In the drawings, Fig. 1 is a sectional view of a telemetric transmitter including a U-tube and square root cam driven by a synchronous motor clock constructed in accordance with my invention.

Fig. 3 is an end elevation of an alternative form of my invention for metering gases, in which the pressure on the manometric liquid varies in proportion to the pressure differential of the gases and in which the contact former forms contact from underneath the liquid surface.

Fig. 4 is a sectional view of such a gas meter shown in Fig. 3 taken along the line 4—4 of Fig. 3.

Figures 7, 8, 9:
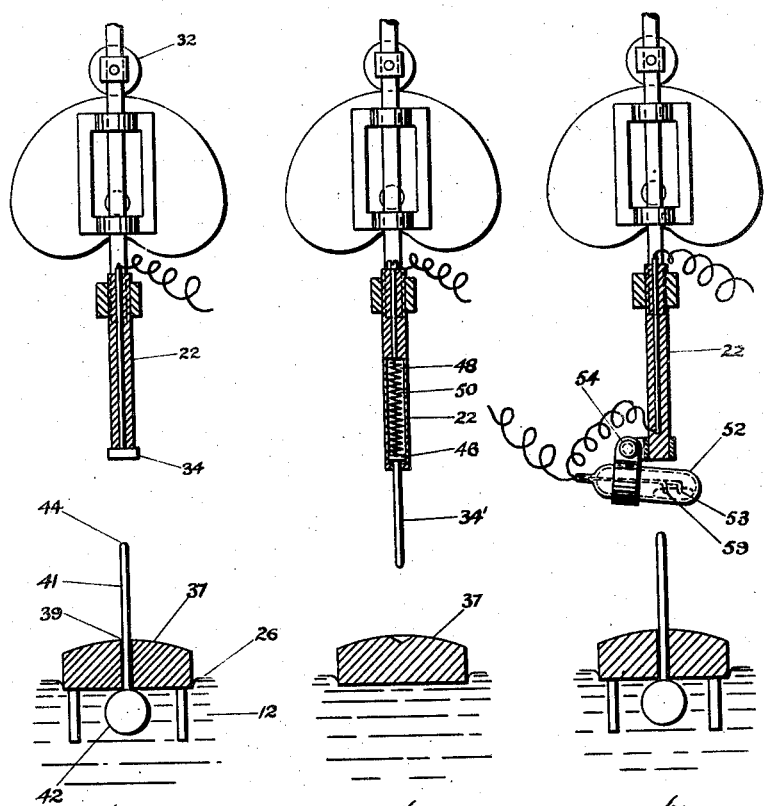

Figs. 7–12 illustrate detailed views of alternative forms of the improved means I may employ for making electrical contact under the control of a manometric or quantity-responsive liquid without piercing the surface thereof, Fig. 7 being a diagrammatic side elevation partially shown in section illustrating one form of means I employ for this purpose in which a float is provided having a hole therein and a supplemental conducting member projecting upwardly through the float, Fig. 8 being a view similar to Fig. 7 showing a different embodiment of this means employing a float without a hole in it and a spring actuated plunger in the end of the contact former reciprocated by the square root cam, Fig. 9 being a view of a different embodiment of my invention generally similar to Fig. 7, but employing a highly sensitive mercury switch pivotally mounted on the end of the reciprocatable contact former to make contact with the supplemental conducting member employed in Fig. 7, Fig. 10 being a view similar to Fig. 7 of a further embodiment of making the electrical connection under control of the quantity-responsive medium employing a reciprocating armature which reciprocates around a core carried by the float on the upper surface of the quantity-responsive liquid to form a magnetic contact for a time duration proportional to the height of said liquid, Fig. 11 being a view similar to Fig. 7 showing an alternative form of means for inductively forming the same connection by bringing the reciprocatable member having a disc at the lower end adjacent to a disc held on top of the conducting member and employing an electronic tube in said circuit, Fig. 12 being a view similar to these other views of a different embodiment of my invention making contact through the means of a weighted conducting member actuating a spring leaf to make the contact.

Fig. 13 is a perspective view of a different embodiment of my invention adapted for use in telemetering pressure and employing a spirally wound pressure responsive Bourdon tube having a terminal of an electric circuit connected to the free end thereof and another contact connected to said circuit movable by a square root cam into contact with the aforesaid terminal and also employing an electronic tube in the electrical connection.

While my invention is primarily employed for sending an electric current to a distant receiving station, it is obvious that it may be employed to merely set up a current in the circuit to send it to a receiving station adjacent thereto.

Figures 1, 2:
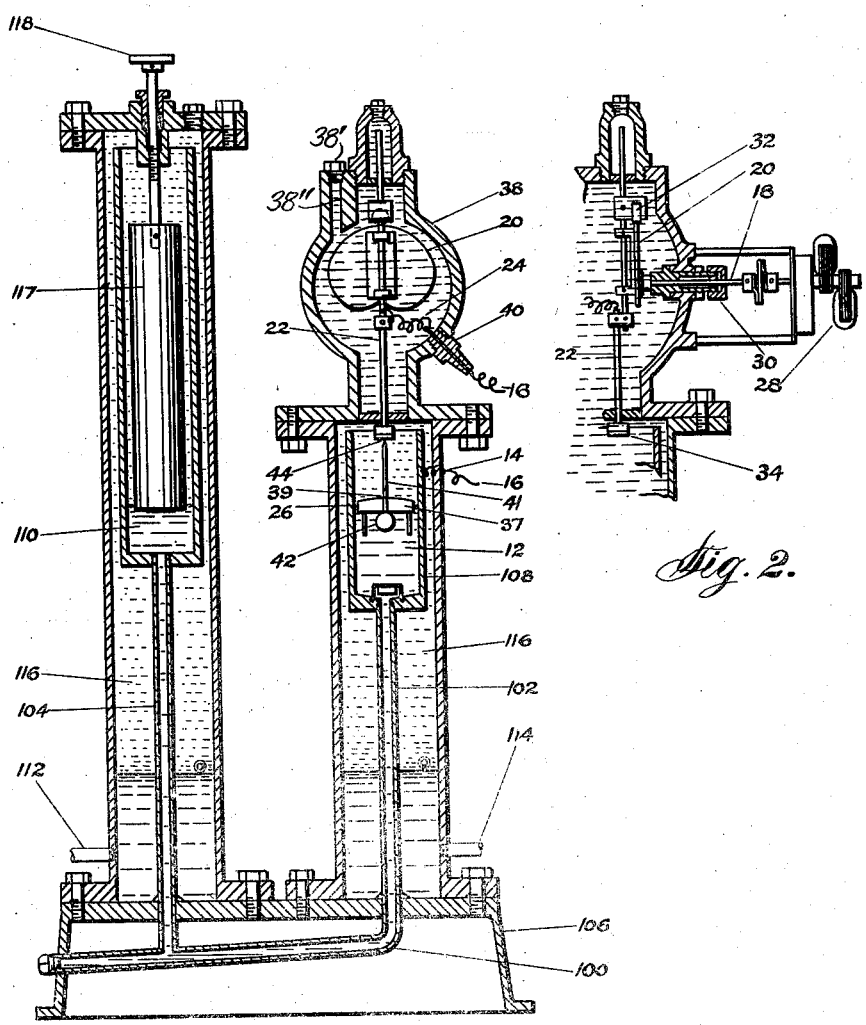
Fig. 2 is a diagrammatic sectional view of the synchronous motor clock and cam actuated contact former taken at right angles to the upper portion of the right hand U-tube leg shown in Fig. 1.

My improved telemetric transmitter shown in Fig. 1 includes the contact medium 12 movable in response to variations in a quantity having means to connect a terminal 14 of an electric circuit 16 thereto. I also provide a shaft 18 and an accurately formed square root cam 20 mounted on said shaft and I provide a contact former or controller 22 having means to connect the opposite terminal 24 to said electric circuit 16 thereto reciprocatable by said square root cam 20 to form a contact through said conducting liquid 12 without piercing the surface 26 thereof and means to revolve said square root cam such as the synchronous electric motor 28 to cause said contact controller 22 to form contact through said contact medium for a time duration proportionate to the displacement of said contact medium 12 and hence square root of said quantity. In the specific embodiment shown the synchronous motor 28 shown in Fig. 2 drives the shaft 18 which extends through the grease packed stuffing box 30 and has the square root cam 20 mounted on the inner end thereof. As shown more particularly in Fig. 2 the contact former 22 has the roller 32 mounted thereon adapted to ride on the upper surface of the accurately formed square root cam 20. Said contact former preferably has at the lower end thereof the contact 34 preferably specially constructed of tungsten. The contact former 22 preferably has an electric terminal 24 connected thereto which extends outwards of the cam box 38 through the plug 40 and becomes a part of the telemetric circuit 16. If it is desired to transmit in other than square root cycles, it is obvious that other shaped cams may be employed.

In the preferred embodiment shown, I actually form contact with the conducting liquid 12 without piercing the upper surface thereof and to this end I provide a float 37 adapted to float on the surface of the mercury or other conducting liquid employed and preferably having a hole 39 therein. The conducting member 41 projects upwardly through said hole 39 and has the float member 42 on the lower end thereof to keep it at all times up against the lower surface of the float being buoyed up there by the mercury to insure that the point 44 of said conducting member will always be in the highest position possible. The point 44 is adapted to be contacted by the flat surface 34 as the contact former 22 is actuated by the cam 20. The conducting member 41 is preferably constructed of the stainless steel. I have shown in Fig. 7 the contact former 22 with the roller 32 thereof on the larger portion of the cam surface and with the contact former itself withdrawn from contact with the conducting member 41. It is obvious, however, that as the cam 20 revolves the contact former will be allowed to drop downwards and that telemetric impulses will be set up in the circuit 16 during the portion of cam rotation that the lower end 34 of said contact former 22 is in contact with the upper end 44 of said conducting member 41 and while said end 34 is in contact with said end 44 during a continued forcing of said contact former downwards, the conducting member will merely reciprocate further into the conducting liquid 12 and thereby form an electrical contact without piercing the surface 26 thereof. It is apparent, however, that other specific types of means to form a contact with the conducting liquid 12 without piercing the surface thereof than my preferred embodiment shown in Figs. 1 and 7 may be employed. I may for instance as shown in Fig. 8, construct the float 37 without a hole and I may provide the lower end of the contact former with a spring actuated plunger 34' in which the head 46 thereof may readily slide backwards in a chamber 48 therein, compressing the spring 50 for this purpose. As shown in Fig. 9 a highly accurate type of mercury switch 52 is pivotally mounted as at 54 on the lower end of the contact controller 22. It is obvious that as the contact former is depressed that the mercury switch becomes tipped upwards causing the mercury to flow toward the other side of the mercury glass container, thus breaking the contact between points 53 and 59. It is apparent that by employing a sensitive mercury switch that any intensity of current may be employed without tending to corrode the contact points.

I have shown in Fig. 10 a still different embodiment of my invention in which the contact is formed through the conducting medium by magnetism. The lower surface 26 of the quantity-responsive liquid has the usual float 37 thereon and has the magnetic core 56 projecting upwardly therefrom. The contact controller 22 has the magnetic solenoid 55 mounted on the lower end thereof and it is obvious that as said solenoid becomes lowered with the contact controller to surround said core 56 that a magnetic electric circuit will be induced within said solenoid for the telemetric transmission.

I have shown in Fig. 11 an alternative form of transmitter which also functions without piercing the surface of the conducting liquid similar in general functioning to that shown in Fig. 7. In this device, however, the telemetric circuit is adapted to be formed by capacity action between a suitable plate 57 mounted on top of the conducting member 41 and a suitable plate 58 mounted on the lower end of the contact controller 22. It is thus obvious that the impulses will be set up by capacity action between said two plates 57 and 58 and transmitted through the means of the electronic tube 60 containing the usual plate, grid, filament and inert gas and through the transformer 62 to the primary self-telemetric circuit 64. I have shown in Fig. 12 still another form of transmitter generally similar in functioning to that shown in Fig. 7, but in which the lower end of the contact controller 22 has the insulating plate 68 projecting laterally from the lower end thereof, a hole 66 for said conducting member and a leaf spring electric switch 70 mounted thereon having a leaf 72 adapted to be depressed by the weight 74 as the contact controller is drawn upwards, into contact with the opposite terminal 76 of the electric circuit, thus forming a type of switch or transmitter rather analogous to an early telegraph key.

I have shown in Fig. 13 an alternative type of transmitter primarily adapted for transmitting the absolute pressure. This embodiment includes a spirally wound Bourdon tube 78 having the fixed end of the coil thereof connected to a pressure pipe 80 and a closed free end 82. The free end has a contact member 84 projecting outwardly therefrom to which a terminal 86 of a secondary circuit is connected. It is thus obvious that the contact 84 varies in response to the quantity to be metered as does the upper surface 26 of the conducting liquid. Preferably the contact 84 is pivotally mounted on the free end 82 of the Bourdon tube, as shown at 83, and when out of engagement with contact former 22', rests against an adjustable stop 85 carried by said free end 82. The contact former 22' has an end pivotally mounted as at 88 and the outer end thereof provided with the roller 90 adapted to ride over the surface of the square root cam 20. It is therefore obvious that the contact 84 is positioned by the Bourdon tube 78 in response to the pressure in the pressure pipe 80 and that the contact former 22' is moved in terms of its square root by means of the square root cam 20 into contact with said variable terminal 84. The telemetric contact may then be transmitted if desired through the electronic tube 60, suitable transformer 61 and through a pivotable switch 92 actuated by the solenoid 94 through the key transmitter contact 96 of the telemetric circuit 16.

Figure 5:
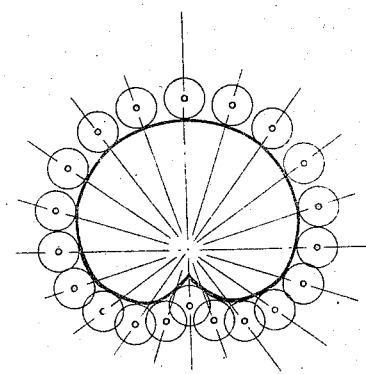
Fig. 5 is a diagrammatic view illustrating the different positions the roller on the contact former takes around the square root cam.
Figure 6:
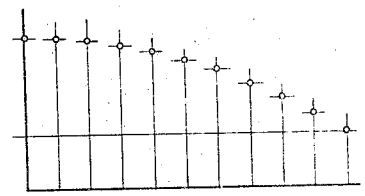
Fig. 6 is a diagrammatic view illustrating how the square root cam is plotted.

I have shown in Fig. 5 the different positions that the roller 32 assumes in rotating relative to the square root cam 20 and I have shown in Fig. 6 a diagram for actually plotting said square root cam in the well known manner. Because I am employing a uniform angular movement rather than the square root function of angular movement, I can and do secure a varied radius of the cam which translates the varied differential into linear movement with a greater accuracy and reliability than has been done hitherto.

I have hitherto described my invention in its broadest aspect. However, it is particularly adapted for metering the rate of flow of fluid in a conduit having a pressure differential producer therein and in the improved embodiment of my invention shown in Fig. 1 includes the U-tube 100, including the leg 102 and leg 104 to which the proper pressure differential connections may be made connected by the U-base 106. The conducting liquid is contained within the U-tube and projects into the head 108 of the leg 102 and the enlarged adjusting head 110 of the U-tube leg 104. The pipe 112 connects the high pressure leg 104 to the high pressure side of the differential producer and the pipe 114 connects the low pressure leg 102 to the low pressure side of the differential producer. An oil seal 116 of ample size fills the interior of the U-tube between the conducting liquid and the surface of the liquid being measured so that the actual electrical contact is always made under the surface of insulating oil. It is thus obvious that with the difference in pressure, the height of the conducting liquid 12 in the enlarged chamber 108 of the low pressure leg 102 will vary substantially in accordance with changes in pressure differential and that with changes in height of the surface 26 of said conducting liquid the time duration of electric contact in the cycle of cam rotation will be varied, thus varying the time duration of electrical impulses set up in the telemetric circuit proportionate to the square root through the medium of the square root cam cycle of the quantity to be measured. In the high pressure U-tube chamber 110, I have provided a counter displacer mercury level zero adjuster 117 which may be moved up and down through the medium of the revolvable handle 118 to vary the height 26 of the conducting liquid to compensate for changes in zero position to adjust the height of liquid to a zero rate of flow at the lowermost position of the contact former or vice versa depending on whether impulses are to be sent during the period of contact or otherwise.

Due to the grease-packed stuffing box 30, the insulating oil in the cam box 38 is prevented from leaking therefrom around the motor driven shaft 18. Said oil may be conveniently introduced into said box 38 upon removing the threaded plug 38' to render accessible the passage 38''.

The embodiment shown in Figs. 3 and 4 is exactly similar to the embodiment shown in Figs. 1 and 2 with the exception that the cam mechanism thereof is inverted. In this instance the pressure connections 112 and 114 come from a gaseous conduit into the legs 102 and 104 of said U-tube and the float 37' rides on the surface 26 of the liquid 12 in said U-tube leg 102 as in the other embodiment. In this embodiment, however, the synchronous motor clock 28 and cam 20 are located within a chamber underneath the leg 102 and, in reciprocating the contact former 22', raise it against the lower end 34' of the conducting member which is in the nonconducting liquid 12 which preferably consists of insulating oil, or other low gravity insulating liquid. Thus a contact is formed when the point 44' of the contact former strikes the end 34' of the conducting member 41 which reciprocates through the usual hole 39 in the float 37' resting on top of the nonconducting liquid 12 in the U-leg 102 as in the other embodiment. The counter displacer 117 is provided to similarly adjust the surface 26 of the liquid 12 as in the other embodiment. The lower compartment 120 around the cam and the lower end of the contact former 22' may be packed with grease if desired. It is obvious, however, that any of the other methods hitherto described for use with the embodiment shown in Fig. 1 for making the actual contact in place of the one shown may be employed.

The operation of my improved invention is obvious from the above description. It is obvious that in any of the embodiments an electric circuit is set up for a portion of the cam cycle, said portion varying according to the height of the conducting liquid or contact medium which varies in response to the quantity to be measured and led to a distant receiver and where a conducting liquid is employed these electric impulses are set up without piercing the surface 26 of the conducting liquid.

It is understood that my invention is not limited to the specific embodiments shown and that various deviations may be made without departing from the spirit and scope of the appended claims.

What I claim is:

1. In a telemetric transmitter for transmitting a function, a contact medium movable in response to variations in a quantity having means to connect a terminal of an electric circuit thereto, a shaft, a cam mounted on said shaft, a contact former having means to connect an opposite terminal of said circuit thereto movable into contact with said contact medium by contact with said cam and means to revolve said shaft to cause said contact former to form contact through said contact medium for a time duration proportional to a function of the displacement of said contact medium.

2. In apparatus for metering a quantity, a fluid containing chamber, a quantity-responsive member, a cyclically moving member, a switch member operated under control of said first named members for a portion of the cycle dependent upon the position of said quantity-responsive member, said members being in said fluid-containing chamber and means operable from without said chamber for altering the relation between one of said members and the others to establish a predetermined relation between the quantity and the portion of the cycle responsive thereto.

3. In a telemetric transmitter, a chamber, a liquid therein displaceable in proportion to a quantity, a float in said chamber positionable by said liquid in correspondence with said quantity, a shaft, a motor outside said chamber for driving said shaft at constant speed, a square root cam mounted on said shaft and cyclically-operable means alternately controllable by said float and said cam for changing the electrical condition of a circuit at two points in each cycle spaced by a time duration corresponding with the square root of the displacement of said liquid.

4. In a telemetric transmitter for transmitting a function, a contact medium movable in response to variations in a quantity having means to connect a terminal of an electric circuit thereto, a shaft, a cam mounted on said shaft, a contact former having means to connect an opposite terminal of said circuit thereto movable to control contact with said contact medium by contact with said cam and means to revolve said shaft to cause said contact former to control contact through said contact medium for a time duration proportional to a function of the displacement of said contact medium.

5. In a transmitter for telemetrically transmitting the rate of flow of gaseous fluid in a conduit having a pressure differential producer therein, said transmitter comprising a U-tube containing a nonconducting liquid and having the legs thereof connectible to said conduit at points above the level of the liquid in said legs and on opposite sides of said differential producer, float means in one leg of said U-tube connectible to a terminal of an electric circuit, a member connectible to the opposite terminal of said circuit and cyclically movable within said liquid below said float to form a contact in cooperation with said float means, and means to cyclically move said member.

6. In a telemetric transmitter for transmitting the square root of a variable pressure, a spiral pressure responsive Bourdon tube having a terminal of an electrical circuit connected to the free end thereof, a shaft, a square root cam mounted on said shaft, a contact former having means to connect an opposite terminal of said circuit thereto and movable into contact with said first-named circuit terminal by contact with said square root cam and means to revolve said shaft to cause said contact former to form contact with said first-named circuit terminal for a time duration proportional to the square root of said variable pressure.

7. In a telemetric transmitter for transmitting a function of a variable pressure, a spiral pressure responsive Bourdon tube having a terminal of an electrical circuit connected to the free end thereof, a shaft, a cam mounted on said shaft, a contact former having means to connect an opposite terminal of said circuit thereto and movable to co-act with said pressure tube's free end by contact with said cam, and means to revolve said shaft to cause said contact former to form contact through cooperation with said Bourdon tube end for a time duration proportional to the function of the displacement of said end.

8. In a telemetric transmitter for transmitting the square root of a variable pressure, a pressure-responsive member, a shaft, a square root cam mounted on said shaft, circuit modifying means movable into cooperation with said pressure-responsive member under the control of said square root cam and means to continuously revolve said cam through a series of successive cycles to cause said circuit modifying means to cooperate with said pressure-responsive member in each of said cycles to produce a change in the electrical condition of an electric circuit for a time duration proportional to the square root of the displacement of said pressure-responsive member and hence square root of said pressure.

9. In a telemetric transmitter for transmitting a non-lineal function of a variable, quantity-responsive means having a portion movable in proportion to said variable, a shaft, a non-lineal cam mounted on said shaft and corresponding with the non-lineal relation between said function and said variable, a contact controller coacting with said cam and said quantity-responsive means, and means to continuously revolve said cam through a series of successive cycles to cause said contact controller to form contact in each of said cycles for a time duration proportional to the function of the displacement of said movable portion of said quantity-responsive means.

10. In a telemetric transmitter, a liquid movable in proportion to a quantity, means positionable by said liquid in correspondence with said quantity, a shaft, a square root cam mounted on said shaft, means for continuously revolving said cam through a series of successive cycles, and means operable by said square root cam and cooperating with said positionable means for changing the electrical condition of an electric circuit in each of said cycles for a time duration proportional to the square root of the displacement of said liquid.

11. In a telemetric transmitter, means movable in response to variations in a quantity, a shaft, a square root cam mounted on said shaft, contact forming means reciprocable by said square root cam to control current flow in an electric circuit when moved to cooperate with said movable means, and means to continuously revolve said cam through a series of successive cycles to cause said contact forming means to cooperate in each of said cycles with said movable means to form contact for a time duration proportional to the square root of the displacement of said movable means and hence square root of said quantity.

12. In a telemetric transmitter, a member displaceable in non-lineal relation to a quantity, a shaft, a non-lineal cam corresponding with said non-lineal relation and mounted on said shaft, a motor for driving said cam continuously at constant speed through a series of successive cycles, and cyclically-operable means controllable by said cam and member for changing the electrical condition of a circuit at two points in each cycle spaced by a time duration corresponding with said quantity.

13. In apparatus for metering a quantity, a fluid containing chamber, a quantity-responsive member, a cyclically moving member, a switch member operated under control of said first named members for a portion of the cycle dependent upon the position of said quantity-responsive member, said members being in said fluid containing chamber and means operable from without said chamber for altering the relation between one of said members and another to render the switch inoperative at a predetermined value of the quantity, such as zero, to establish a predetermined relation between the quantity and the portion of the cycle responsive thereto.

14. In a telemetric transmitter, means positionable substantially proportionately to a quantity, means cyclically reciprocable into coaction with said means, an electric circuit, a switch connected therewith and mechanically operable by said means upon their coaction and adapted to set up currents in said circuit corresponding therewith and hence to said quantity.

15. In a flow meter in which the rate of flow is substantially proportional to the square root of a fluid variable, a circuit, means displaceable corresponding to said variable, a square root cam, means for continuously rotating said cam at constant speed through a plurality of successive cycles, cyclically movable means operable by said cam in square root cycles to co-act with said displaceable means, contact means in said circuit adapted to be operated by said cyclically movable means to change the electrical condition of said circuit for a portion of said cycle proportional to the square root of the displacement of said displaceable means and hence substantially proportional to said rate of flow.

16. In a device responsive to a variable, a fluid containing chamber, means displaceable corresponding to said variable, a constant speed rotating shaft, a square root cam on said shaft, means actuated by said cam in square root cycles to co-act with said displaceable means, and switch means controlled by said cam actuated means and said displaceable means, all of said means being within said fluid containing chamber.

JOHN C. THORESEN.